US008046829B2

(12) United States Patent
Oba

(10) Patent No.: US 8,046,829 B2
(45) Date of Patent: Oct. 25, 2011

(54) METHOD FOR DYNAMICALLY AND SECURELY ESTABLISHING A TUNNEL

(75) Inventor: Yoshihiro Oba, Forte Lee, NJ (US)

(73) Assignees: Toshiba America Research, Inc., Piscataway, NJ (US); Telcordia Technology, Inc., Piscataway, NJ (US)

( * ) Notice: Subject to any disclaimer, the term of this patent is extended or adjusted under 35 U.S.C. 154(b) by 914 days.

(21) Appl. No.: 11/161,733

(22) Filed: Aug. 15, 2005

(65) Prior Publication Data

US 2006/0041742 A1     Feb. 23, 2006

Related U.S. Application Data

(60) Provisional application No. 60/601,980, filed on Aug. 17, 2004.

(51) Int. Cl.
*G06F 15/16* (2006.01)
(52) U.S. Cl. ............................................ 726/14; 726/15
(58) Field of Classification Search .................... 726/14, 726/15
See application file for complete search history.

(56) References Cited

U.S. PATENT DOCUMENTS 6,058,431 A * 5/2000 Srisuresh et al. ............. 709/245

FOREIGN PATENT DOCUMENTS

| JP | 2000-36809 A | 2/2000 |
| JP | 2001-238192 A | 8/2001 |
| JP | 2002-123491 A | 4/2002 |

OTHER PUBLICATIONS

Parthasarathy, M.; "PANA enabling IPsec based Access Control"; May 2004; PANA Working Group; pp. 1-15.*
The Cable Guy; "IPsec NAT Traversal Overview"; Aug. 2002; Microsoft Technet; pp. 1-6.*
Kivinen et al.; RFC 3947 "Negotiation of NAT-Traversal in the IKE"; Jan. 2005; The Internet Society; pp. 1-13.*
archive for Guy reference: http://web.archive.org/web/*/http://www.microsoft.com/technet/community/columns/cableguy/cg0802.mspx.*
Forsberg et al. "Protocol for Carrying Authentication for Network Access (PANA)" PANA Working Group, Jun. 2003; downloaded from http://www.ietf.org/proceedings/57/I-D/draft-ietf-pana-pana-01.txt on Apr. 10, 2010.*
C. Perkins, IP Encapsulation within IP, Oct. 1996, p. 1-14, USA.
C. Perkins, Minimal Encapsulation within IP, Oct. 1996, p. 1-6, USA.
D. Farinacci, Generic Routing Encapsulation, Mar. 2000, p. 1-9, The Internet Society, USA.
C. Perkins, IP Mobility Support for IPv4, Aug. 2002, p. 1-98, The Internet Society.
D. Harkins, The Internet Key Exchange (IKE), Nov. 1998, p. 1-39, The Internet Society, USA.
Charlie Kaufman, Internet Key Exchange Protocol, May 29, 2004, p. 1-105, The Internet Society, USA.

(Continued)

*Primary Examiner* — Kaveh Abrishamkar
(74) *Attorney, Agent, or Firm* — Westerman, Hattori, Daniels & Adrian, LLP

(57) ABSTRACT

A system and method is disclosed for dynamically and securely establishing a tunnel for a mobile device. In the preferred embodiments, the system and method operate to dynamically assign one or more tunnel endpoint addresses to a client which is not on the same IP-link as an authentication agent depending on an authentication result based on using an authentication protocol source port number in order to address communications.

16 Claims, 4 Drawing Sheets

OTHER PUBLICATIONS

B. Aboba, Extensible Authentication Protocol, Jun. 2004, p. 1-63, The Internet Society, USA.

P. Jayaraman, PANA Framework, Jul. 16, 2004, p. 1-5, The Internet Society, USA.

D. Forsberg, Protocol for Carrying Authentication for Network Access (PANA), Jul. 17, 2004, p. 1-72, The Internet Society, USA.

M. Parthasarathy, PANA enabling IPsec based Access Control, May 2004, p. 1-15, The Internet Society, USA.

Parthasarathy, "PANA Enabling IPsec Based Access Control." PANA Working Group, May 2004, pp. 1-15, The Internet Society, USA.

The Cable Guy. "IPsec NAT Traversal Overview." Microsoft TechNet. Aug. 2002, pp. 1-5, Microsoft Corporation, USA.

Kivinen et al. "Negotiation of NAT-Traversal in the IKE," Internet RFC/STD/RYI/BCP Archives, Jan. 2005, 1-15, The Internet Society, USA.

Japanese Office Action dated Aug. 24, 2010, issued in corresponding Japanese Patent Application No. 2007-527946.

Chiba G. Dommety M Eklund Cisco Systems M et al.; "Dynamic Authorization Extensions to Remote Authentication Dial in User Service (RADIUS); rfc3576.txt". IETF Standard, Internet Engineering Task Force, IEFT, CH, Jul. 1, 2003, XP015009358.

Supplementary European Search Report dated Jul. 14, 2011, issued in corresponding European Patent Application No. 05790295.9.

Jayaraman Net Com R Lopez Univ of Murcia Y Ohba (Ed) Toshiba M Parthasarathy Nokia A Yegin Samsung P: "Pana Framework", vol. pana, No. 1, Jul. 16, 2004, XP015024807.

* cited by examiner

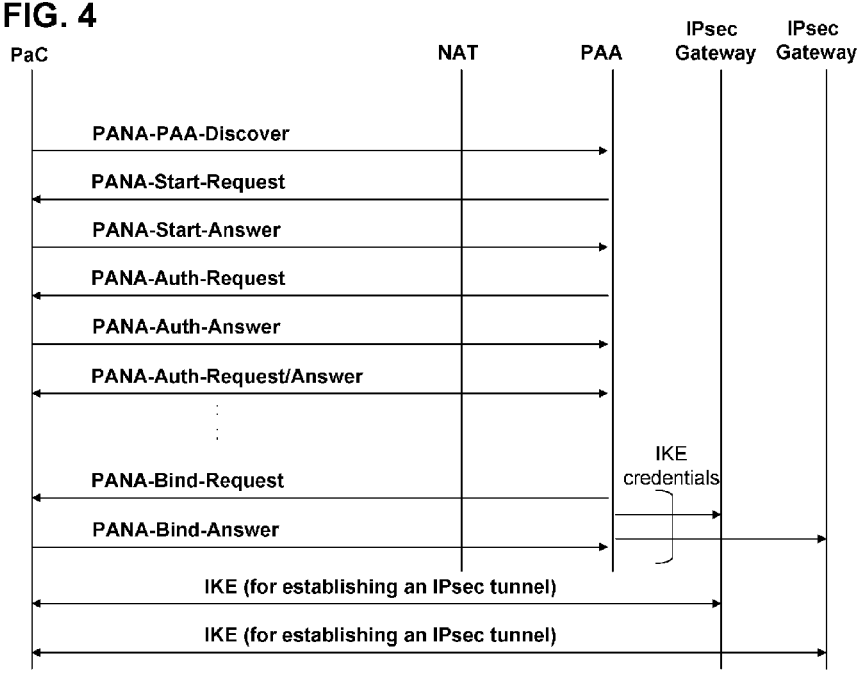

| PANA Message Direction | Source IP Address | Destination IP Address | Source Port | Destination Port |
|---|---|---|---|---|
| PaC to PAA | PaC's address (before traversing NAT). NAT's address (after traversing NAT). | PAA's IP address (for all messages). Multicast address (for PANA-PAA-Dicover only). | P1(before traversing NAT). P2(after traversing NAT). | PANA Port |
| PAA to PaC | PAA's address | NAT's address (before traversing NAT). PaC's address (after traversing NAT). | PANA Port | P2 (before traversing NAT). P1 (after traversing NAT). |

METHOD FOR DYNAMICALLY AND SECURELY ESTABLISHING A TUNNEL

The present application claims priority to provisional application No. 60/601,980 filed on Aug. 17, 2004, entitled A Method for Dynamically and Securely Establishing a Tunnel.

BACKGROUND

1. Field of the Invention

The present application relates to, inter alia, methods for dynamically and securely establishing tunnels in computer networks. The entire disclosures of each of the following co-pending patent applications of the present assignee are incorporated herein by reference for background: 1) U.S. patent application Ser. No. 10/761,243 entitled Mobility Architecture Using Pre-Authentication, Pre-Configuration And/Or Virtual Soft-Handoff, filed on Jan. 22, 2004; 2) U.S. patent application Ser. No. 10/908,199, filed on May 2, 2005, entitled Quarantine Networking; and 3) U.S. patent application Ser. No. 10/975,497 filed on Oct. 29, 2004, entitled Dynamic Host Configuration And Network Access Authentication.

2. Background Discussion:

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infra-red, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11 g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

The preferred embodiments improve upon technologies described, e.g., in the following references, the disclosures of which are all incorporated herein by reference in their entireties:

[RFC2003] C. Perkins, "IP Encapsulation within IP," RFC 2003, October 1996.

[RFC2004] C. Perkins, "Minimal Encapsulation within IP," RFC 2004, October 1996.

[RFC2784] D. Farinacci, et al., "Generic Routing Encapsulation (GRE)," RFC 2784, March 2000.

[RFC2401] S. Kent and R. Atkins, "Security Architecture for the Internet Protocol," RFC 2401, November 1998.

[RFC3344] C. Perkins, "IP Mobility Support for IPv4," RFC 3344, August 2002.

[RFC3775] C. Perkins, et al, "IP Mobility Support for IPv6," June 2004.

[RFC2409] D. Harkins and D. Carrel, "The Internet Key Exchange (IKE)," RFC 2409, November 1998.

[IKEv2] C. Kaufman, "Internet Key Exchange (IKEv2) Protocol," Internet-Draft, draft-ietf-ipsec-ikev2-14.txt, work in progress, November 2004.

[RFC3748] B. Aboba, et al, "Extensible Authentication Protocol (EAP)," RFC 3748, June 2004.

[PANA-FRWK] P. Jayaraman, "PANA Framework," Internet-Draft, draft-ietf-pana-framework-01.txt, work in progress, July 2004.

[PANA] D. Forsberg, et al, "Protocol for Carrying Authentication for Network Access (PANA)," Internet-Draft, draft-ietf-pana-pana-05.txt, work in progress, July 2004.

[PANA-IPSEC] M. Parthasarathy, "PANA Enabling IPsec Based Access Control," Internet-Draft, draft-ietf-pana-ipsec-03.txt, May 2004.

The Internet Protocol defines a way to carry a network layer packet (i.e., an IP datagram in the Internet Protocol) over various link-layers including Ethernet and PPP (Point-to-Point Protocol). An IP datagram can also be carried over an "IP-link" where it is transmitted while encapsulated in the payload of another IP datagram. This technique is referred to as "IP tunneling" or "tunneling." Tunneling is used as a means to alter the normal IP routing for datagrams, by delivering them to an intermediate destination that would otherwise not be selected based on the (network part of the) IP Destination Address field in the original IP header [see C. Perkins, "IP Encapsulation within IP," RFC 2003, October 1996]. Once the encapsulated datagram arrives at this intermediate destination node, it is decapsulated, yielding the original IP datagram, which is then delivered to the destination indicated by the original Destination Address field. The IP-link that provides the tunneling functionality is referred to as a "tunnel." The encapsulator and decapsulator of the IP-link in tunneling are then considered to be the "endpoints" of the tunnel.

A tunnel may be based on, e.g., IP-in-IP encapsulation [see C. Perkins, "IP Encapsulation within IP," RFC 2003, October 1996], Minimal Encapsulation [see C. Perkins, "Minimal Encapsulation within IP," RFC 2004, October 1996], Generic Routing Encapsulation (GRE) [see D. Farinacci, et al., "Generic Routing Encapsulation (GRE)," RFC 2784, March 2000], IPsec tunnel mode encapsulation [see S. Kent and R. Atkins, "Security Architecture for the Internet Protocol," RFC 2401, November 1998.]. A tunnel is created either statically or dynamically. When a tunnel is based on IP-in-IP encapsulation, Minimal Encapsulation or GRE, and the tunnel is used by an IP mobility protocol for tunneling IP datagrams from a home agent to a mobile node, the tunnel is dynamically created by using Mobile IPv4 [see C. Perkins, "IP Mobility Support for IPv4," RFC 3344, August 2002] or Mobile IPv6 [see C. Perkins, et al, "IP Mobility Support for IPv6," RFC3775, June 2004]. When a tunnel is based on IPsec tunnel mode encapsulation, the tunnel may be dynamically created by using IKEv1 [see D. Harkins and D. Carrel, "The Internet Key Exchange (IKE)," RFC 2409, November 1998] or IKEv2 [see C. Kaufman, "Internet Key Exchange (IKEv2) Protocol," Internet-Draft, draft-ietf-ipsec-ikev2-14.txt, work in progress, November 2004]. An appropriate authentication method is involved with any of the above methods for dynamically creating a tunnel.

For reference, a mobile station needs to be able to communicate with access points in different networks (e.g., LANs). Thus, there is a need to resolve the mapping between the IP address and the MAC address of the AP. There are two preferred approaches for AP resolution: pre-configured resolution (e.g., static resolution) and dynamic resolution. In static resolution, a mobile station can, e.g., obtain a list of pairs of IP address and MAC address of each nearby AP before it receives beacon frames from those APs. In dynamic resolution, the mapping for an AP can be, e.g., resolved when the mobile station receives a beacon frame or the like from the AP.

For reference, in, for example, Mobile Internet Protocol (Mobile IP), a home agent can involve a router on a mobile node's home network that maintains, e.g., information about the device's current location, as identified, e.g., in its care-of-address (CoA). The home agent can use, e.g., tunneling mechanisms to forward Internet traffic so that, e.g., the device's IP address doesn't have to be changed each time it connects from a different location. In some instances, a home agent may work in conjunction with a foreign agent, which can include a router on a visited network. The foreign agent and the home agent are two types of mobility agents (defined, e.g., in the Internet Engineering Task Force (IETF) R.F.C. 2002 specification.

PANA:

For reference, information related to PANA from P. Jayaraman, "PANA Framework," Internet-Draft, draft-ietf-pana-framework-01.txt, work in progress, July 2004 is incorporated herein in this section. In this regard, PANA is a link-layer agnostic network access authentication protocol that runs between a node that wants to gain access to the network and a server on the network side. PANA defines a new EAP [see B. Aboba, et al, "Extensible Authentication Protocol (EAP)," RFC 3748, June 2004] lower layer that uses IP between the protocol end points. Id.

The motivation to define such a protocol and the requirements are described in Yegin, A. and Y. Ohba, *Protocol for Carrying Authentication for Network Access (PANA)Requirements*, draft-ietf-pana-requirements-08 (work in progress), June 2004. Protocol details are documented in Forsberg, D., Ohba, Y., Patil, B., Tschofenig, H. and A. Yegin, *Protocol for Carrying Authentication for Network Access (PANA)*, draft-ietf-pana-pana-04 (work in progress), May 2004. Parthasarathy, M., *PANA Enabling IPsec Based Access Control*, draft-ietf-pana-ipsec-03 (work in progress), May 2004.describes the use of IPsec for access control following PANA-based authentication. IPsec can be used for per-packet access control, but nevertheless it is not the only way to achieve this functionality. Alternatives include reliance on physical security and link-layer ciphering. Separation of PANA server from the entity enforcing the access control has been envisaged as an optional deployment choice. SNMP [see Mghazli, Y., Ohba, Y. and J. Bournelle, *SNMP Usage for PAA-2-EP Interface*, draft-ietf-pana-snmp-00 (work in progress), April 2004 has been chosen as the protocol to carry associated information between the separate nodes. Id.

PANA design provides support for various types of deployments. Access networks can differ based on the availability of lower-layer security, placement of PANA entities, choice of client IP configuration and authentication methods, etc. Id.

PANA can be used in any access network regardless of the underlying security. For example, the network might be physically secured, or secured by means of cryptographic mechanisms after the successful client-network authentication. Id.

The PANA client, PANA authentication agent, authentication server, and enforcement point have been functional entities in this design. PANA authentication agent and enforcement point(s) can be placed on various elements in the access network (such as, e.g., access point, access router, dedicated host). Id.

IP address configuration mechanisms vary as well. Static configuration, DHCP, stateless address autoconfiguration are possible mechanisms to choose from. If the client configures an IPsec tunnel for enabling per-packet security, configuring IP addresses inside the tunnel becomes relevant, for which there are additional choices such as IKE. Id.

PANA protocol is designed to facilitate authentication and authorization of clients in access networks. PANA is an EAP [see Aboba, B., Blunk, L., Vollbrecht, J., Carlson, J. and H. Levkowetz, *Extensible Authentication Protocol (EAP)*, RFC 3748, June 2004, lower-layer that carries EAP authentication methods encapsulated inside EAP between a client host and an agent in the access network. While PANA enables the authentication process between the two entities, it is only a part of an overall AAA and access control framework. An AAA and access control framework using PANA includes four functional entities, as discussed below and as schematically depicted in FIGS. 1(A) to 1(C). Id.

A first functional entity is a PANA Client (PaC) is the client implementation of the PANA protocol. This entity resides on the end host that is requesting network access. The end hosts can include, for example, laptops, PDAs, cell phones, desktop PCs and/or the like that are connected to a network via a wired or wireless interface. A PaC is responsible for requesting network access and engaging in the authentication process using the PANA protocol. Id.

A second functional entity is a PANA Authentication Agent (PAA) is the server implementation of the PANA protocol. A PAA is in charge of interfacing with the PaCs for authenticating and authorizing them for the network access service. The PAA consults an authentication server in order to verify the credentials and rights of a PaC. If the authentication server resides on the same host as the PAA, an application program interface (API) is sufficient for this interaction.

When they are separated (a more common case in public access networks), a protocol is used to run between the two. LDAP [see Hodges, J. and R. Morgan, *Lightweight Directory Access Protocol (v3): Technical Specification*, RFC 3377, September 2002] and AAA protocols like RADIUS [see Rigney, C., Willens, S., Rubens, A. and W. Simpson, *Remote Authentication Dial In User Service (RADIUS)*, RFC 2865, June 2000] and Diameter [see Calhoun, P., Loughney, J., Guttman, E., Zorn, G. and J. Arkko, *Diameter Base Protocol*, RFC 3588, September 2003] are commonly used for this purpose. Id.

The PAA is also responsible for updating the access control state (i.e., filters) depending on the creation and deletion of the authorization state. The PAA communicates the updated state to the enforcement points in the network. If the PAA and EP are residing on the same host, an API is sufficient for this communication. Otherwise, a protocol is used to carry the authorized client attributes from the PAA to the EP. While not prohibiting other protocols, currently SNMP [see Mghazli, Y., Ohba, Y. and J. Bournelle, *SNMP Usage for PAA-2-EP Interface*, draft-ietf-pana-snmp-00 (work in progress), April 2004, has been suggested for this task. Id.

The PAA resides on a node that is typically called a Network Access Server (NAS) in the local area network. The PAA can be hosted on any IP-enabled node on the same IP subnet as the PaC. For example, on a BAS (broadband access server) in DSL networks, or PDSN in 3GPP2 networks. Id.

A third functional entity is an Authentication Server (AS), which is the server implementation that is in charge of verifying the credentials of a PaC that is requesting the network access service. The AS receives requests from the PAA on behalf of the PaCs, and responds with the result of verification together with the authorization parameters (e.g., allowed bandwidth, IP configuration, etc). The AS might be hosted on the same host as the PAA, on a dedicated host on the access network, or on a central server somewhere on the Internet. Id.

A fourth functional entity is an Enforcement Point (EP), which is the access control implementation that is in charge of allowing access to authorized clients while preventing access by others. An EP learns the attributes of the authorized clients from the PAA. The EP uses non-cryptographic or cryptographic filters to selectively allow and discard data packets. These filters may be applied at the link-layer or the IP-layer. When cryptographic access control is used, a secure association protocol needs to run between the PaC and EP. Link or network layer protection (for example, TKIP, IPsec ESP) is used after the secure association protocol established the necessary security association to enable integrity protection, data origin authentication, replay protection and optionally confidentiality protection. An EP should be located strategically in a local area network to minimize the access of unauthorized clients to the network. For example, the EP can be hosted on a switch that is directly connected to clients in a wired network. That way, the EP can drop unauthorized packets before they reach any other client host or beyond the local area network. Id.

Some of the entities may be co-located depending on the deployment scenario. For example, the PAA and EP could be on the same node (BAS) in DSL networks. In that case, a simple API is sufficient between the PAA and EP. In small enterprise deployments, the PAA and AS may be hosted on the same node (e.g., access router) that eliminates the need for a protocol run between the two. The decision to co-locate these entities or otherwise, and their precise location in the network topology are deployment decisions. Id.

Use of IKE or 4-way handshake protocols for secure association has been only required in the absence of any lower-layer security prior to running PANA. Physically secured networks (such as, e.g., DSL) or networks that are already cryptographically secured on the link-layer prior to PANA run (e.g., cdma2000) do not require additional secure association and per-packet ciphering. These networks can bind the PANA authentication and authorization to the lower-layer secure channel that is already available. Id.

The EP on the access network allows general data traffic from any authorized PaC, whereas it allows only limited type of traffic (e.g., PANA, DHCP, router discovery) for the unauthorized PaCs. This ensures that the newly attached clients have the minimum access service to engage in PANA and get authorized for the unlimited service. Id.

The PaC needs to configure an IP address prior to running PANA. After a successful PANA authentication, depending on the deployment scenario, the PaC may need to re-configure its IP address or configure additional IP address(es). The additional address configuration may be executed as part of the secure association protocol run. Id.

An initially unauthorized PaC starts the PANA authentication by discovering the PAA on the access network, followed by the EAP exchange over PANA. The PAA interacts with the AS during this process. Upon receiving the authentication and authorization result from the AS, the PAA informs the PaC about the result of its network access request. Id.

If the PaC is authorized to gain the access to the network, the PAA also sends the PaC-specific attributes (e.g., IP address, cryptographic keys, etc.) to the EP by using SNMP. The EP uses this information to alter its filters for allowing data traffic from and to the PaC to pass through. Id.

In case cryptographic access control needs to be enabled after the PANA authentication, a secure association protocol runs between the PaC and the EP. The PaC should already have the input parameters to this process as a result of the successful PANA exchange. Similarly, the EP should have obtained them from the PAA via SNMP. Secure association exchange produces the required security associations between the PaC and the EP to enable cryptographic data traffic protection. Per-packet cryptographic data traffic protection introduces additional per-packet overhead but the overhead exists only between the PaC and EP and will not affect communications beyond the EP. In this sense, it is important to place the EP as close to the edge of the network as possible. Id.

Finally data traffic can start flowing from and to the newly authorized PaC. Id.

PANA with Bootstrapping IPsec

As discussed in P. Jayaraman, "PANA Framework," Internet-Draft, draft-ietf-pana-framework-01.txt, work in progress, July 2004, in this model, data traffic is protected by using IPsec tunnel mode SA and an IP address is used as the device identifier of PaC. Some or all of AP, DHCPv4 Server (including PRPA DHCPv4 Server and IPsec-TIA DHCPv4 Server), DHCPv6 Server, PAA and EP may be co-located in a single device. The EP is co-located with AR (Access Router) and may be co-located with PAA. When EP and PAA are not co-located, PAA-EP protocol is used for communication between PAA and EP.

PANA Device Identifier

For reference, in the current PANA specification:
http://www.ietf.org/internet-drafst/draft-ietf-pana-pana-10.txt, a "device identifier" (DI) is defined as: The identifier used by the network as a handle to control and police the network access of a device. Depending on the access technology, this identifier may contain an address that is carried in protocol headers (e.g., IP or link-layer address), or a locally significant identifier that is made available by the local protocol stack (e.g., circuit id, PPP interface id) of a connected device.

PANA Mobility Operations

The PANA working group document entitled PANA Mobility Operations found at draft-ietf-pana-mobopts-00.txt 1, the entire disclosure of which is incorporated herein by reference, explains that a PANA Authentication Client (PaC) using PANA needs to execute full EAP/PANA upon inter-subnet (e.g., inter-PAA) movement, and explains that in case seamless mobility is desirable, having to execute full EAP authentication with a AAA server would incur undesirable latency. Accordingly, the document outlines extensions to the base PANA specification to eliminate the need to execute EAP each time the PaC performs an inter-PAA handover. The scheme allows the creation of a new PANA session with a new PAA based on an existing session with another PAA. The document explains that generation of the new PANA session does not require executing EAP-based authentication, but that, instead, a context-transfer-based scheme is used to bring in relevant state information from the previous PAA to the new PAA. For reference, a call flow depicting mobility-optimized PANA execution is shown in said document. The document explains that in this flow, the PaC is already authorized and connected to subnet 1, where pre-PAA resides; then, the PaC performs a handover from subnet 1 to subnet 2; then, PANA discovery and handshake phases are executed; then, in response to the parameters included in the PSA, PANA session context is transferred from the pre-PAA to the new-PAA; and last, the PANA-Bind exchange signals the successful PANA authorization. EAP authentication does not occur. As a result, a mobile PaC's network access authentication performance can be enhanced by deploying a context-transfer-based mechanism, where some session attributes are transferred from the previous PAA to the new one in order to avoid performing a full EAP authentication.

SUMMARY OF THE INVENTION

The preferred embodiments of the present invention overcome various deficiencies found in the existing art.

According to some embodiments, a method for dynamically and securely establishing a tunnel for a mobile device is provided that includes: dynamically assigning one or more tunnel endpoint addresses to a client which is not on the same IP-link as an authentication agent depending on an authentication result based on using an authentication protocol source port number in order to address communications.

In some examples, the method further includes that in order to allow a protocol to run between a client and an authentication agent that are not on the same IP-link, not only the IP address of the client or the authentication agent but also a source port number of messages sent from the client or the authentication agent is used as a device identifier of the client or the authentication agent.

In some examples, the method includes dynamically assigning one or more tunnel endpoint addresses to a PANA client which is not on the same IP-link as a PANA authentication agent, depending on the PANA authentication result.

In some examples, the method further includes using an IP address of the client and a UDP source port number of authentication messages sent from the client as a device identifier of the client so as to distinguish multiple clients which may be behind the same Network Address Translation router.

In some examples, the method further includes that in order to allow a PANA protocol to run between a PANA client and a PANA authentication agent that are not on the same IP-link, not only the IP address of the PANA client or PANA authentication agent but also the UDP source port number of PANA messages sent from the PANA client or PANA authentication agent is used as a device identifier of the PANA client or PANA authentication agent so as to distinguish multiple PANA clients which may be behind the same Network Address Translation router.

In some examples, the method further includes the client sending an initial discover message initiating an authentication session and subsequent authentication messages to the authentication agent with specifying a UDP port number assigned for the authentication protocol as a UDP Destination Port, and the authentication agent sending authentication messages to the client with specifying a UDP Source Port of the initial discover message as a UDP Destination Port.

In some examples, the method further includes the PANA client initiating the PANA session by sending a PANA-PAA-Discover (PDI) and subsequent PANA messages to the PANA authentication agent with specifying the UDP port number assigned for PANA as the UDP Destination Port, and the PANA authentication agent sending PANA-Start-Request and subsequent PANA messages to the PANA client with specifying the UDP Source Port of the PDI as the UDP Destination Port.

In some examples, the method further includes that when a Network Address Router exists between a client and an authentication agent, inhibiting the Network Address Router from deleting its address translation state. In some examples, the method includes performing a PANA message exchange defined for peer liveness tests in a manner to inhibit the Network Address Router from deleting its address translation state.

In some examples, the method further includes when a client that has established a session with an authentication agent that is not on the same IP-link knows that it moved to a new IP-link, performing the same mobility handling procedure.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 4 is an illustrative diagram illustrative message flows in accordance with some illustrative embodiments of the invention;

FIG. 5 is an illustrative diagram showing illustrative message header information in transmission of messages between a client (PaC) and an authentication agent (PAA) in accordance with some illustrative embodiments.

DETAILED DISCUSSION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Problems With Existing Methods:

The existing methods for dynamically establishing a tunnel have a variety of problems, such as, e.g., illustrated by the following.

- IP mobility management protocol such as Mobile IPv4 and Mobile IPv6 are not always necessary for dynamically establishing a tunnel.
- Mobile IPv4 and IKEv1 do not support EAP (Extensible Authentication Protocol) [see RFC3748] with which a number of authentication methods are supported. There is a need for a secure tunnel establishment method with which EAP authentication is involved considering the recent proliferation of EAP.
- The existing methods do not support dynamically assigning a tunnel endpoint to the other endpoint (e.g., to a new endpoint) depending on the authentication result of the other endpoint.
- IKEv2 supports EAP authentication, but IKEv2 signaling and EAP authentication are so tightly coupled that EAP re-authentication needs to be performed when an IKE_SA (IKE Security Association) is established, which is inefficient when multiple tunnels are established from a single endpoint to different endpoints. The PANA (Protocol for Carrying Authentication for Network Access) framework [see P. Jayaraman, "PANA Framework," Internet-Draft, draft-ietf-pana-framework-01.txt, work in progress, July 2004] allows a PANA client for establishing multiple IPsec tunnel mode SAs with different IPsec gateways. However, the current PANA framework does not fully support the case where a PANA client is more than one IP hop away from the PANA authentication agent. In this regard, an IP hop relates to a trip that a data packet takes from one router or intermediate point to another in a network; the "hop count" is the number of hops a packet takes toward its destination.

Figure 1A:
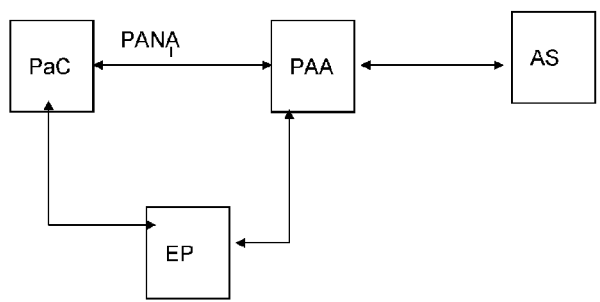
FIG. 1(A) is a schematic diagram illustrating functional components of an authenticator and a client according to some illustrative implementations.
Figure 1C:
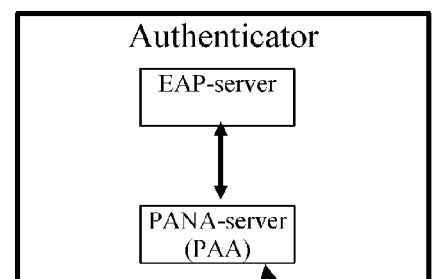
FIG. 1(C) is a schematic diagram depicting a mobile client in communication with a first Access Point (AP) and a second Access Point (AP) according to some illustrative implementations.
Figure 1B:
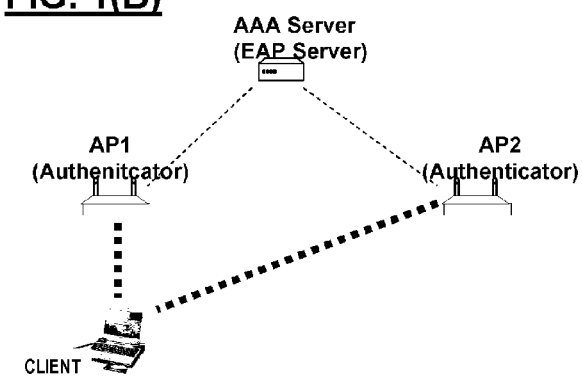
FIG. 1(B) is a schematic diagram illustrating four basic functional components according to some illustrative implementations employing PANA.
Figure 1B:
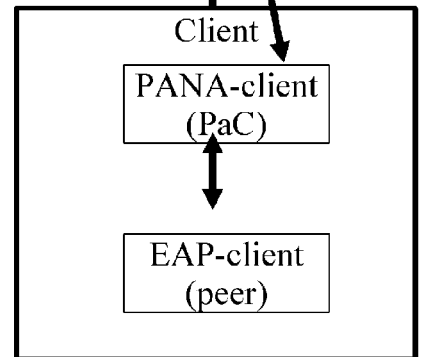
Figure 2:
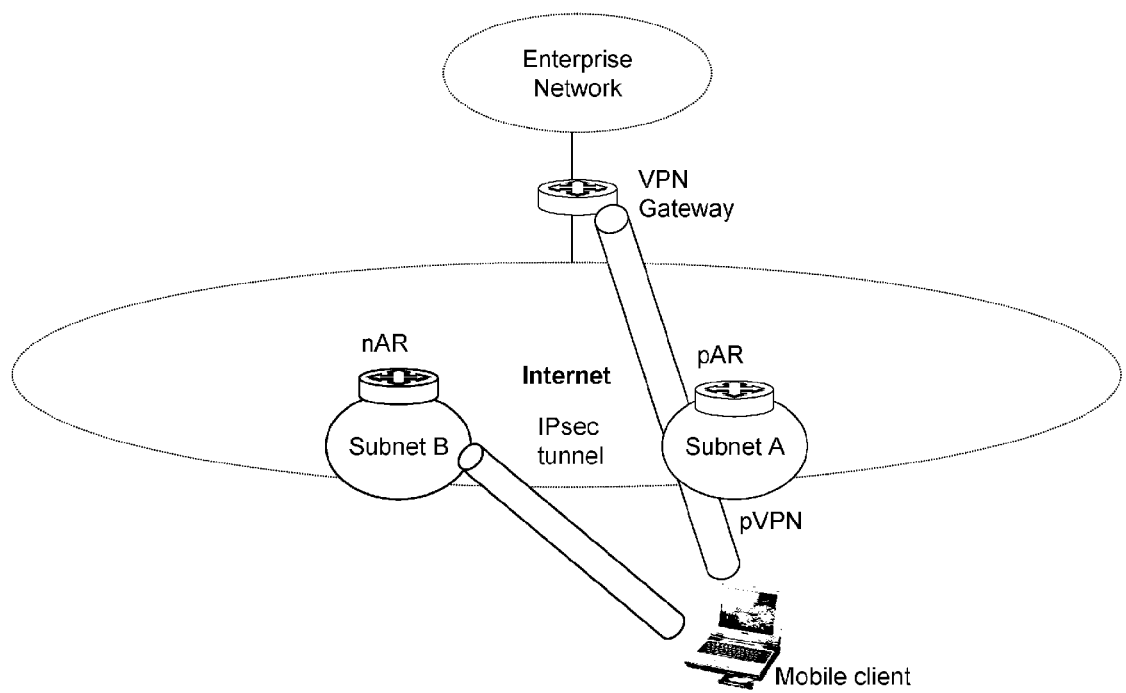
FIG. 2 is a schematic diagram depicting a mobile client in communication with a first Access Router (pAR) and a second Access Router (nAR) in such a manner as to establish concurrent VPNs, with IPsec tunneling.

General:

FIGS. 1(A), 1(B), 1(C) and 2 depict some illustrative architectural components that may be employed in some embodiments of the invention. In this regard, as described above, FIG. 1(A) is a schematic diagram illustrating four basic functional components according to some illustrative implementations employing PANA: a PANA client (PaC); a PANA Authentication Agent (PAA); an Authentication Server (AS) and an Enforcement Point (EP). FIG. 1(B) is a schematic diagram depicting a mobile client in communication with a first Access Point (AP) and a second Access Point (AP) according to some illustrative implementations. FIG. 1(C) is a schematic diagram illustrating functional components of an authenticator and a client that may be employed in some illustrative implementations, in which the authenticator includes, among other things, EAP-server and PANA-server (PAA) functionality, while the client includes, among other things, EAP-client and PANA-client (PaC) functionality. FIG. 2 is a schematic diagram depicting a mobile client in communication with a first Access Router (pAR) and a second Access Router (nAR) in such a manner as to establish concurrent VPNs, with IPsec tunneling.

The preferred embodiments provide proposed solutions that can provide a way for dynamically and securely establishing a tunnel with EAP being involved in PANA authentication. In the preferred embodiments, a proposed solution uses the PANA protocol [see D. Forsberg, et al, Protocol for Carrying Authentication for Network Access (PANA), Internet-Draft, draft-ietf-pana-pana-05.txt, work in progress, July 2004] with extending the protocol in a way that can dynamically assign one or more tunnel endpoint addresses to a PANA client which is not necessarily on the same IP-link as the PANA authentication agent, depending on the PANA authentication result. The following extension to the PANA protocol is defined in this proposal.

In the preferred embodiments, in order to allow the PANA protocol to run between a PANA client (PaC) and a PANA authentication agent (PAA) that are not on the same IP-link, for messages sent from the PaC to the PAA, not only the IP address of the PANA client, but also the UDP (User Datagram Protocol) source port number of PANA messages sent from the PANA client is preferably used as the device identifier of the PANA client (and, for messages sent in the reverse direction from the PAA to the PaC, not only the IP address of the PAA, but also the UDP source port number of PANA messages sent from the PANA authentication agent is preferably used as a device identifier of the PAA), in order to distinguish multiple PANA clients which may even be, for example, behind the same Network Address Translation (NAT) router or the like. It is noted that PANA uses UDP as its transport layer protocol. It is also noted that a NAT typically involves a single device, such as a router, that acts as agent between a public network (e.g., the Internet) and a private network (e.g., a local area network) and that enables, e.g., a single unique IP address to represent a group of computers or devices to entities outside the private network. A NAT router essentially translates traffic coming into and going out from the private network.

In the preferred embodiments, in order to make PANA work under NAT environments, the PANA client can always become the initiator of the PANA session by sending a PANA-PAA-Discover (PDI) and all subsequent PANA messages to the PANA authentication agent with specifying the UDP port number assigned for PANA as the UDP Destination Port (NB: this UDP port number would be a pre-assigned port number in the preferred embodiments), and the PANA authentication agent can send PANA-Start-Request and all subsequent PANA messages to the PANA client with specifying the UDP Source Port of the PDI as the UDP Destination Port of the messages (NB: this UDP port number would be have been assigned by the NAT in the preferred embodiments). It is noted, for reference, that a PANA-PAA-Discover (PDI) message is sent by a PaC to a PAA and is used to discover the address of PAA(s), while a PANA-Start-Request (PSR) is sent by the PAA to the PaC.

It is also noted, for reference, that a PANA-Bind-Request and a PANA-Bind-Answer message exchange had been used for binding device identifiers of the PaC and EP(s), and the IP address of the PAA to the PANA SA. When IPsec-based security was the choice of access control, the PAA would provide IP address(es) as EP(s)' device ID, and would expect the PaC to provide its IP address in return. However, by further including, e.g., a source port number as part of the device identifier, as described above, substantial advantages can be achieved.

As set forth above, the current PANA specification definition of "device identifier" at http.//www.ietf.org/internet-drafst/draft-ietf-pang-pang-10.txt involves a definition that does not contain UDP port number to be used within a device identifier. On the other hand, in the preferred embodiments, the current definition of a device identifier is redefined to include such a UDP port number in the manner as set forth above. In the preferred embodiments, a device identifier is, thus, redefined so as to include the capability to distinguish multiple clients or authentication agents. Thus, in the preferred embodiments, the device identifier also operates as "distinguishment identifier" of the client or the authentication agent so as to enable distinguishing multiple clients or authetncication agents.

Figure 3:
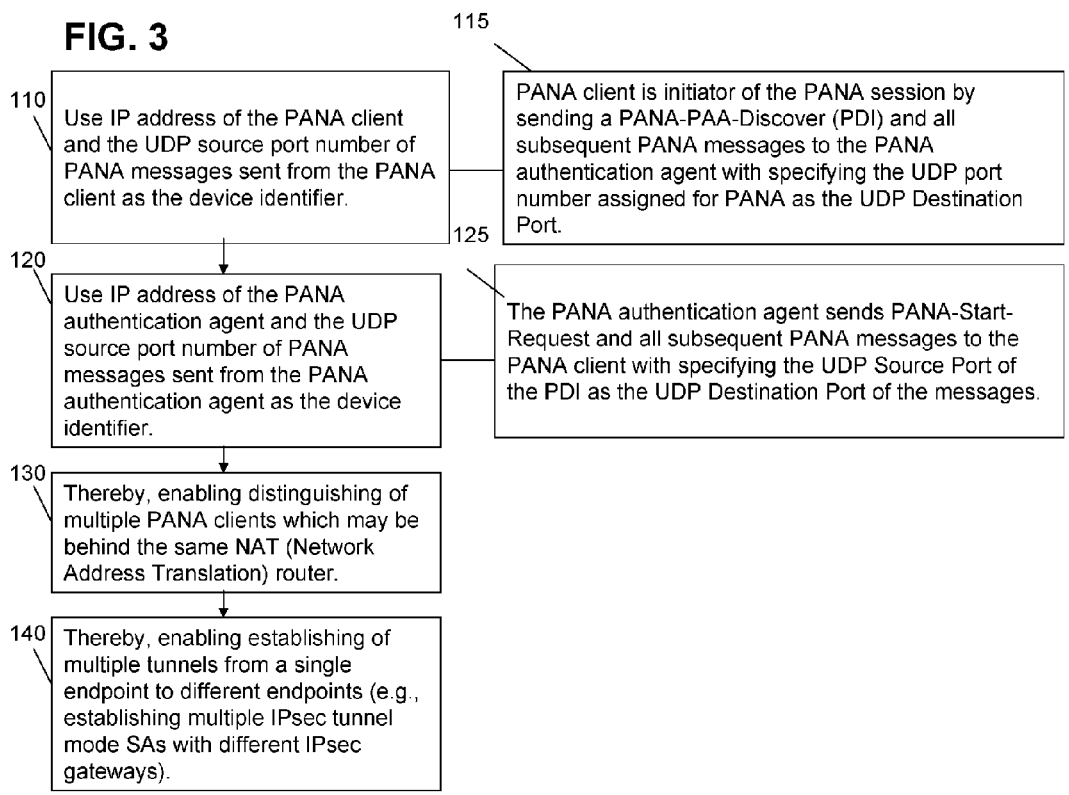
FIG. 3 is a schematic diagram that helps to depict some features according to some preferred embodiments of the invention.

FIG. 3 is a schematic diagram that helps to depict some features according to some preferred embodiments of the invention.

In this regard, as shown at 110, the preferred embodiments advantageously "Use IP address of the PANA client and the UDP source port number of PANA messages sent from the PANA client as the device identifier." In addition, as shown at 115, preferably the PANA client is initiator of the PANA session by sending a PANA-PAA-Discover (PDI) and all subsequent PANA messages to the PANA authentication agent with specifying the UDP port number assigned for PANA as the UDP Destination Port.

Further, as shown at 120, the preferred embodiments advantageously "Use IP address of the PANA authentication agent and the UDP source port number of PANA messages sent from the PANA authentication agent as the device identifier." In addition, as shown at 125, preferably the PANA authentication agent sends PANA-Start-Request and all subsequent PANA messages to the PANA client with specifying the UDP Source Port of the PDI as the UDP Destination Port of the messages.

Accordingly, as shown at 130, the preferred embodiments thereby enable "distinguishing of multiple PANA clients which may be behind the same NAT (Network Address Translation) router."

Furthermore, as shown at 140, the preferred embodiments "thereby enable "establishing of multiple tunnels from a single endpoint to different endpoints (e.g., establishing multiple IPsec tunnel mode SAs with different IPsec gateways)."

Referring now to FIG. 4, this figure is a diagram showing illustrative message flows in accordance with some illustrative embodiments of the invention. In particular, FIG. 4 depicts message flows between the PaC and the PAA, through the NAT, beginning with the PANA-PAA-Discover message, through to the establishment of IPsec tunnels for multiple IPsec gateways as shown in FIG. 4.

Referring now to FIG. 5, this figure is a diagram showing illustrative message information used in the transmission of messages between a client (PaC) and an authentication agent (PAA) in accordance with some illustrative embodiments. In particular, as shown, for messages from the PaC to the PAA, the Source IP Address is initially that of the PaC's address before traversing the NAT and that of the NAT's address after traversing the NAT; in addition, the Destination IP Address is a multicast address for the initial PANA-PAA-Discover message and the PAA's IP address for all later messages; in addition, the source port is shown as P1 (as an example) before traversing the NAT and P2 (as an example) after traversing the NAT; and, the destination port is the PANA port. On the other hand, for messages in the reverse direction from the PAA to the PaC, the Source IP Address is the PAA's IP address; in addition, the Destination IP Address is the NAT's address before traversing the NAT and the PaC's address after traversing the NAT; in addition, the source port is the PANA port; and, the Destination Port is shown as P2 before traversing the NAT and P1 after traversing the NAT.

Allocating Tunnel Endpoints:

The preferred embodiments can use the method that is already defined in the PANA specification as it is to dynamically establish a tunnel. That is, an IPsec tunnel mode can be used as the tunneling method and one or more tunnel endpoints can be specified in PANA signaling through EP-Device-Id AVPs (Attribute Value Pairs) that are carried in a PANA-Bind-Request message. The proposed scheme preferably uses IPsec tunnel mode because it provides a secure tunnel and also works even under NAT environments. The IPsec tunnels are preferably established by using IKEv1 or IKEv2 where the required IKE credential is bootstrapped from PANA by using the method specified in [see M. Parthasarathy, "PANA Enabling IPsec Based Access Control," Internet-Draft, draft-ietf-pana-ipsec-03.txt, May 2004].

Keeping NAT State:

In some embodiments, a NAT router is caused to maintain a certain NAT state. By way of example, when a NAT router exists between a PANA client and a PANA authentication agent, a PANA message exchange defined for peer liveness test (e.g., PANA-Reauth-Request/Answer) can be performed at some frequency (e.g., at certain time intervals) so as to prevent the NAT router from deleting its address translation state.

Mobility Handling:

In some instances, a PaC may be a mobile PaC that moves from one PAA to another PAA. In some embodiments, when a PANA client that has an established PANA session with a PANA authentication agent that is not on the same IP-link, if it knows that it moves to a new IP-link, the same PANA mobility handling procedure can be performed.

In this regard, some existing PANA mobility handling procedures can be found at the following documents of the PANA working group: (1) PANA Mobility Operations found at draft-ietf-pana-mobopts-00.txt and (2) Preauthentication Support For PANA by Y. Ohba found at http://www.ietf.org/internet-drafts/draft-bournelle-pana-ctp-03.txt. These documents describe a mobility optimization method based on Context Transfer Protocol (CTP). The above document (1) describes PANA protocol extension for CTP, and the above document (2) describes CTP extension to PANA. The entire disclosures of documents (1) and (2) are incorporated herein by reference. For additional reference, the entire disclosures of the following U.S. provisional patent applications are also incorporated herein by reference: (1) Ser. No. 60/595,169 entitled Framework of Media Independent Pre-Authentication Support for PANA, of Y. Ohba, filed on Jun. 13, 2005 and (2) Ser. No. 60/649,554 entitled Framework of Media Independent Pre-Authentication filed on Feb. 4, 2005.

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method for dynamically and securely establishing a tunnel for a mobile device, comprising:
   dynamically assigning one or more tunnel endpoint addresses to a client which is not on the same IP-link as an authentication agent depending on an authentication result based on using an authentication protocol source port number in order to address communications,
   further including that in order to allow a protocol to run between a client and an authentication agent that are not on the same IP-link, not only the IP address of the client but also a source port number of messages sent from the client is used as a device identifier of the client so as to distinguish multiple clients, such that the client device identifier is redefined to enable identification of multiple clients,
   further including that not only the IP address of the authentication agent but also a source port number of messages sent from the authentication agent is used as a device identifier of the authentication agent, such that the authentication agent's device identifier is redefined to enable identification of multiple authentication agents,
   further including establishing multiple IPsec tunnels from said client to different endpoints, including dynamically assigning a tunnel endpoint to a new endpoint depending on an authentication result for another endpoint,
   further including extending PANA protocol such as to dynamically assign a tunnel endpoint address to a PANA client which is not on the same IP-link as a PANA authentication agent depending on a prior PANA authentication result,
   wherein in order to allow the PANA protocol to run between the PANA client and the PANA authentication agent that are not on the same IP-link, a) for messages sent from the PANA client to the PANA authentication agent, not only the IP address of the PANA client but also the source port number of PANA messages sent from the PANA client is used as a PANA device identifier of the PANA client and b) for messages sent from the PANA authentication agent to the PANA client, not only the IP address of the PANA authentication agent but also the source port number of PANA messages sent from the PANA authentication agent is used as a PANA device identifier of the PANA authentication agent.

2. The method of claim 1, further including performing a PANA authentication message exchange including:
   the PANA client being the initiator of the PANA session by sending a PANA-PAA-Discover message to the PANA authentication agent behind a Network Address Translation router and subsequent PANA messages to the PANA authentication agent with specifying a UDP port number assigned for PANA;
   the PANA authentication agent sending a PANA-Start-Request and subsequent PANA messages to the PANA client with specifying a UDP source port number of the PANA-PAA-Discover message; and
   the PANA authentication agent and the PANA client performing a PANA-Bind-Request and a PANA-Bind-Answer message exchange for binding identifiers of the PANA client and for each of the multiple endpoints.

3. The method of claim 1, further including that when a Network Address Router exists between a client and an authentication agent, inhibiting the Network Address Router from deleting its address translation state.

4. The method of claim 2, further including establishing a plurality of IPsec tunnels based on said PANA authentication message exchange including using IKE credentials established for multiple IPsec gateways where the IKE credentials are bootstrapped from PANA.

5. A method for dynamically and securely establishing a tunnel for a mobile device, comprising:
   dynamically assigning one or more tunnel endpoint addresses to a client which is not on the same IP-link as an authentication agent depending on an authentication result based on using an authentication protocol source port number in order to address communications,
   wherein said method includes dynamically assigning one or more tunnel endpoint addresses to a PANA client which is not on the same IP-link as a PANA authentication agent, depending on the PANA authentication result,
   further including using an IP address of the client and a UDP source port number of authentication messages sent from the client as a device identifier of the client so as to distinguish multiple clients which are behind the same Network Address Translation router,
   further including that in order to allow a PANA protocol to run between a PANA client and a PANA authentication agent that are not on the same IP-link, not only the IP address of the PANA client or PANA authentication agent but also the UDP source port number of PANA messages sent from the PANA client or PANA authentication agent is used as a device identifier of the PANA client or PANA authentication agent so as to distinguish multiple PANA clients which are behind the same Network Address Translation router, and
   further including establishing multiple IPsec tunnels from said client to different endpoints, including dynamically assigning a tunnel endpoint to a new endpoint depending on an authentication result for another endpoint,
   further including extending PANA protocol such as to dynamically assign a tunnel endpoint address to a PANA client which is not on the same IP-link as a PANA authentication agent depending on a prior PANA authentication result.

6. The method of claim 5, further including the PANA client initiating the PANA session by sending a PANA-PAA-Discover (PDI) and subsequent PANA messages to the PANA authentication agent with specifying the UDP port number assigned for PANA as the UDP Destination Port, and the PANA authentication agent sending PANA-Start-Request and subsequent PANA messages to the PANA client with specifying the UDP Source Port of the PDI as the UDP Destination Port.

7. The method of claim 5, further including performing a PANA authentication message exchange including:
the PANA client being the initiator of the PANA session by sending a PANA-PAA-Discover message to the PANA authentication agent behind a Network Address Translation router and subsequent PANA messages to the PANA authentication agent with specifying a UDP port number assigned for PANA;
the PANA authentication agent sending a PANA-Start-Request and subsequent PANA messages to the PANA client with specifying a UDP source port number of the PANA-PAA-Discover message; and
the PANA authentication agent and the PANA client performing a PANA-Bind-Request and a PANA-Bind-Answer message exchange for binding identifiers of the PANA client and for each of the multiple endpoints.

8. The method of claim 7, further including establishing said plurality of IPsec tunnels using a version of IKE, said IPsec tunnels being established between said mobile device and different IPsec gateways and each of said IPsec tunnels being established based on the prior PANA authentication without requiring re-authentication.

9. The method of claim 5, further including establishing said secure tunnels with EAP authentication.

10. The method of claim 5, further including that when a Network Address Router exists between a PANA client and a PANA authentication agent, inhibiting the Network Address Router from deleting its address translation state.

11. The method of claim 10, further including performing a PANA message exchange defined for peer liveness tests in a manner to inhibit the Network Address Router from deleting its address translation state.

12. The method of claim 5, further including when a client that has established a session with an authentication agent that is not on the same IP-link knows that it moved to a new IP-link, performing mobility handling procedures.

13. The method of claim 12, wherein said mobility handling procedures include mobility optimization based on Context Transfer Protocol.

14. The method of claim 5, further including when a PANA client that has established a PANA session with a PANA authentication agent that is not on the same IP-link knows that it moved to a new IP-link, performing PANA mobility handling procedures.

15. The method of claim 14, wherein said mobility handling procedures include mobility optimization based on Context Transfer Protocol.

16. The method of claim 5, further including said mobile including a PANA client (PaC) that sends messages to a PANA authentication agent (PAA) in which a Source IP Address is initially that of the PaC's address before traversing a Network Access Translation router (NAT) and that of the NAT's address after traversing the NAT, and in which a Destination IP Address is a multicast address for an initial PANA-PAA-Discover message and the PAA's IP address for later messages, and the Source Port is shown as a first port before traversing the NAT and a second port after traversing the NAT, and the Destination Port is a the PANA port.

* * * * *

UNITED STATES PATENT AND TRADEMARK OFFICE
CERTIFICATE OF CORRECTION

PATENT NO. : 8,046,829 B2
APPLICATION NO. : 11/161733
DATED : October 25, 2011
INVENTOR(S) : Oba It is certified that error appears in the above-identified patent and that said Letters Patent is hereby corrected as shown below:

On the Title Page, in Item (75), under "Inventor", in Column 1, Line 1, delete "Forte Lee," and insert -- Fort Lee, --, therefor.

On the Title Page, in Item (73), under "Assignees", in Column 1, Lines 2-3, delete "Telcordia Technology, Inc.," and insert -- Telcordia Technologies, Inc., --, therefor.

On Title Page 2, in Item (56), under "OTHER PUBLICATIONS", in Column 2, Line 9, delete "IEFT," and insert -- IETF, --, therefor.

In the Drawings

In Fig. 1(B), Sheet 1 of 4,

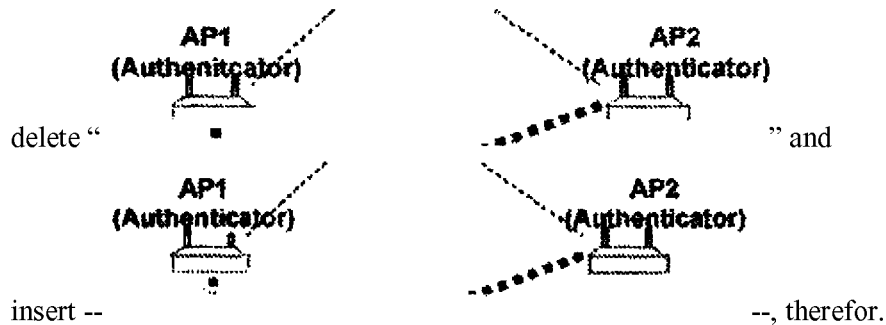

delete " " and insert -- --, therefor.

In the Specification

In Column 8, Lines 61-62,
delete "http:// www.ietf.org/internet-drafst/draft-ietf-pana-pana-10.txt," and
insert -- http://www.ietf.org/internet-drafts/draft-ietf-pana-pana-10.txt, --, therefor.

Signed and Sealed this
Eighteenth Day of November, 2014

Michelle K. Lee
*Deputy Director of the United States Patent and Trademark Office*

CERTIFICATE OF CORRECTION (continued)
U.S. Pat. No. 8,046,829 B2

In Column 13, Lines 10-11,
delete "http.//www.ietf.org/internet-drafst/draft-ietf-pang-pang-10.txt" and
insert -- http://www.ietf.org/internet-drafts/draft-ietf-pana-pana-10.txt --, therefor.

In Column 13, Lines 21-22, delete "authetncication" and insert -- authentication --, therefor.

In Column 13, Line 49, delete ""thereby" and insert -- thereby --, therefor.

In the Claims

In Column 18, Line 34, in Claim 16, delete "is a the" and insert -- is a --, therefor.